(No Model.)

J. J. HOGAN.
COLLARED PIPE COUPLING.

No. 459,907. Patented Sept. 22, 1891.

Attest:
F. C. Fischer
John Vanherb Jr

Inventor
John J. Hogan, per
Crane & Miller, Attys.

UNITED STATES PATENT OFFICE.

JOHN J. HOGAN, OF NEW YORK, N. Y., ASSIGNOR TO THE HOGAN ENGINEERING COMPANY, OF SAME PLACE.

COLLARED PIPE-COUPLING.

SPECIFICATION forming part of Letters Patent No. 459,907, dated September 22, 1891.

Application filed June 14, 1888. Renewed March 9, 1891. Serial No. 384,373. (No model.)

*To all whom it may concern:*

Be it known that I, JOHN J. HOGAN, a citizen of the United States, residing in the city, county, and State of New York, have invented certain new and useful Improvements in Collared Pipe-Couplings, fully described and represented in the following specification and the accompanying drawings, forming a part of the same.

The object of this invention is to furnish a means of embracing two pipe ends and pressing them together rigidly; and the invention consists in the specific construction herein shown and described.

Figure 1:
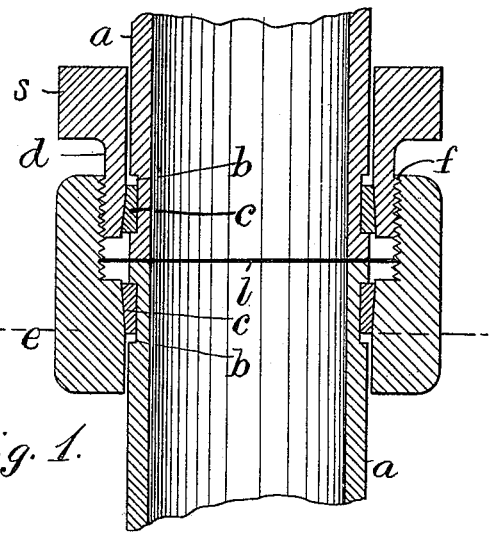
Figure 3:
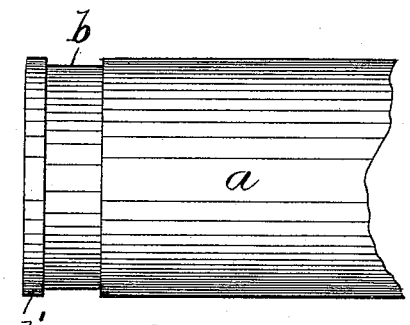
Figure 2:
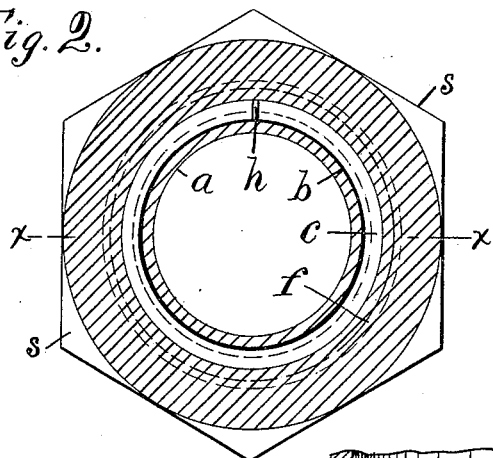
Figure 4:
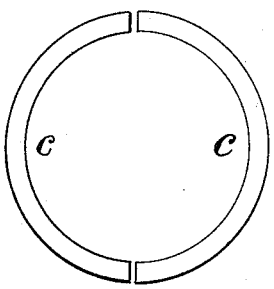

In the drawings, Figure 1 is a longitudinal section of the coupling and two pipe ends on line $x\ x$ in Fig. 2. Fig. 2 is an end view of the coupling and pipe. Fig. 3 is a side view of one of the pipe ends. Fig. 4 is an end view of the collar divided at two points, and Fig. 5 is a longitudinal section of two pipe ends with coupling provided with bolting-flanges.

In Fig. 1 the ends of two pipes $a$ are opposed to one another, with an intermediate packing $l$, each pipe being formed with a cylindrical groove $b$ adjacent to the end, thus leaving a shoulder $b'$ upon the end of the pipe. A collar $c$, with cylindrical bore, is fitted into each of the grooves $b$, in contact with the shoulder $b'$, and is externally tapered from the end of the pipe backward to form a conical exterior projecting slightly above the surface of the pipe. The collar may be divided in two halves, as shown in Fig. 4, or divided by a notch at one side only, as shown at $h$ in Fig. 2, which is the preferable construction, as it thus requires to be sprung over the shoulder $b'$ into the groove and is held therein by its elasticity while uniting the pipe ends. $d$ and $e$ are sleeves formed to slip over the pipe ends, and each is provided internally with a conical seat fitted to the tapering exterior of the collar $c$.

Figure 5:
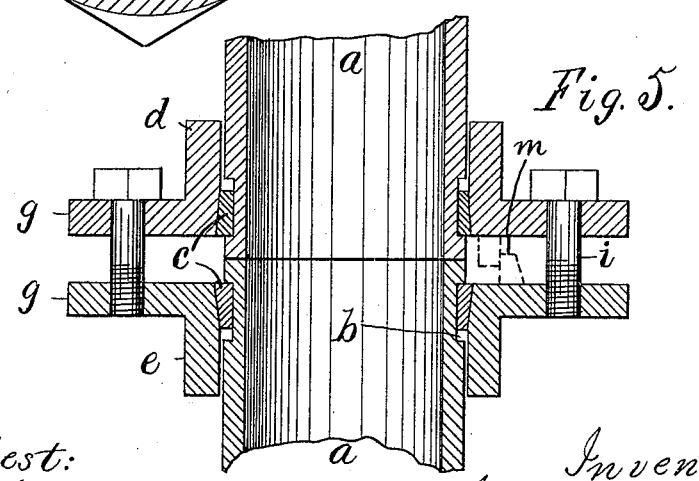

In Figs. 1 and 2 the sleeves are provided with external and internal screw-threads $f$ and would be formed with hexagon seats $s$ to turn the sleeves by a wrench, and in Fig. 5 the sleeves are formed with flanges $g$, connected by bolts $i$.

With either mode of construction the sleeves may be drawn toward one another upon the collars $c$, operating, first, to jam the collars firmly into the grooves $b$, and, secondly, to draw the pipe ends into close contact with one another.

In applying the coupling to a pipe the sleeve is first slipped over the end of the pipe past the groove to permit the application of the collar to the latter, and the collar is then inserted in the groove and the sleeve drawn toward the end of the pipe to bring the conical seat within the sleeve into contact with the exterior of the collar. The tapering of the collar backward from the end of the pipe permits the application of the tapering seat within the sleeve to the rear edge of the collar with great facility, while the conical form of both parts jams the sleeve upon the collar at the desired point. The sleeves are then drawn together by the screw-threads $f$ or screw-bolts $i$ and draw the pipe ends together in the desired manner. The taper upon one side of the collar makes it thicker upon one edge than the other and enables it to perform the function of a wedge between the pipe and sleeve when the sleeves are drawn together, and the pipes, sleeves, and collars thus become rigidly jammed together and held firmly in the desired position by the resulting friction when the coupling is wholly attached.

A packing-washer $l$ is shown in Fig. 1 inserted between the pipe ends to form a joint, and such packing, which would be of the same bore as the pipes, may be made of tin, lead, copper, rubber, or any suitable material; or the pipe ends may be smoothly finished and the joint formed by the mere contact of their surfaces, as shown in Fig. 5. The exterior of the packing-washer is preferably formed to fit within one of the sleeves, as shown in Fig. 1, to center it properly and to prevent its crowding into the bore of the pipe. To center the pipe ends accurately upon one another, the flanges $g$ may, if desired, be provided with annular ribs to form a slip-joint, as indicated in dotted lines at $m$ in Fig. 5.

I am aware that it is common to press the ends of the pipes and fittings together by various means and that tapered collars divided in sections like mine have been used in contact with the inner side of the pipe to form a packing in a conical joint.

I am also aware that divided sleeves threaded externally and provided with integral collars upon their inner sides have been fitted to grooved pipe ends and used in connection with an internally-threaded socket to draw such ends together; but in such construction no tapering surfaces are employed to jam the parts in rigid contact with one another.

In my construction the collar is wholly detached from the other parts, and is of no greater thickness than the pipe itself, and is therefore exceedingly simple in form and may be inexpensively made by casting of malleable iron or by rolling a bar of suitable section and bending the same into rings of the desired size.

The collar in my construction differs from any loose collar heretofore fitted to a groove in the pipe in being thicker at one edge than the other, so as to perform the function of a wedge. The collar thus operates to jam the sleeve and the pipe end into rigid connection and to thus form the most rigid union between the pipe ends.

What I claim as my invention is—

In a pipe-coupling, the combination, with two divided collars $c$, having longitudinal bore and tapered externally in opposite directions, of the sleeves $d$ and $e$, provided with tapering seats fitted to the exterior of such collars and with means for drawing the sleeves together upon the collars, as and for the purpose set forth.

In testimony whereof I have hereunto set my hand in the presence of two subscribing witnesses.

JOHN J. HOGAN.

Witnesses:
C. E. CADY,
THOS. S. CRANE.